United States Patent
Vornsand

(10) Patent No.: US 6,661,471 B1
(45) Date of Patent: Dec. 9, 2003

(54) SELECTABLE ON POSITION FOR SINGLE CLOSURE CONTROL TELEVISION RECEIVER

(75) Inventor: Steven J. Vornsand, Lake in the Hills, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/225,941

(22) Filed: Jan. 5, 1999

(51) Int. Cl.$^7$ .............................................. H04N 5/50
(52) U.S. Cl. ................................... 348/731; 348/734
(58) Field of Search ................................ 348/725, 730, 348/731, 733, 734; 725/78, 83, 84

(56) References Cited

U.S. PATENT DOCUMENTS

| | | | | |
|---|---|---|---|---|
| 2,812,486 A | * | 11/1957 | Foster | 348/731 |
| 3,918,002 A | * | 11/1975 | Leuschner | 377/110 |
| 4,228,543 A | * | 10/1980 | Jackson | 455/181 |
| 4,249,256 A | * | 2/1981 | Molinari et al. | 455/180 |
| 4,305,155 A | * | 12/1981 | Romeo | 455/153 |
| 4,375,651 A | * | 3/1983 | Templin et al. | 348/734 |
| 4,392,256 A | * | 7/1983 | Russell | 455/354 |
| 4,527,194 A | * | 7/1985 | Sirazi | 348/731 |
| 4,866,434 A | * | 9/1989 | Keenan | 340/825.72 |
| 5,193,005 A | * | 3/1993 | Tomita | 348/732 |
| 5,278,988 A | * | 1/1994 | Dejean et al. | 455/185.1 |
| 5,408,275 A | * | 4/1995 | Song et al. | 348/734 |
| 5,410,361 A | * | 4/1995 | Lee | 348/570 |
| 5,457,448 A | * | 10/1995 | Totsuka et al. | 340/825.72 |
| 5,508,762 A | * | 4/1996 | Lee | 348/734 |
| 5,535,162 A | * | 7/1996 | Uenoyama | 365/189.01 |
| 5,708,475 A | * | 1/1998 | Hayashi et al. | 348/468 |
| 5,850,218 A | * | 12/1998 | LaJoie et al. | 725/45 |
| 6,084,645 A | * | 7/2000 | Park et al. | 348/734 |
| 6,271,831 B1 | * | 8/2001 | Escobosa et al. | 345/158 |

* cited by examiner

Primary Examiner—Victor R. Kostak

(57) ABSTRACT

A television receiver system for a healthcare environment where the television receiver has provision for connection of a pendant control mechanism that houses a single switch for controlling the television receiver ON/OFF and tuning functions in a sequential manner and may also contain a pillow speaker and a volume control. The receiver tuning system comprises a cyclical sequence of individual positions for receiving television channels, radio signals and instructional channels, and a position for turning the television receiver OFF. Any position may be designated as the ON position to which the system tunes whenever it is activated, with the OFF position being designated as the position immediately below the ON position.

7 Claims, 2 Drawing Sheets

SELECTABLE ON POSITION FOR SINGLE CLOSURE CONTROL TELEVISION RECEIVER

Background of the Invention and Prior Art

This invention relates generally to single closure control television receiver systems in institutional environments and particularly to a single closure control television receiver system for use in a healthcare environment.

Television receivers that are used in hospitals, nursing homes or similar healthcare institutional settings, often incorporate a pendant mechanism that houses a pillow speaker, a volume control and a single switch closure control for activating and deactivating the television receiver and cycling through all of the television channels stored in the television receiver's viewable or allowed channel memory. There is usually a finite number of "positions" made available, with certain positions being used for television programs and others being dedicated to music or to informational or instructional programs, at the discretion of the institution. It will be appreciated that these television receivers are, for the most part, designed for the normal consumer market and are adapted to meet the special needs of the institutional market. The cyclical nature of the control system and the single switch closure preferred for use in the institutional market necessitates a television receiver design in which the power ON/OFF event position is situated below the lowest channel number position (and above the highest channel number position) in the channel number list. Therefore the television receiver must be tuned to display the lowest numbered channel in the channel list whenever the receiver is activated or turned ON. In certain situations, however, the institutional operator requires that the television receiver display a channel other than the lowest numbered channel in the channel list when the television receiver is activated or turned ON. In this situation, the prior art television receiver systems prevent the television receiver from displaying any channel numbers that are below the ON channel position, with the result that many channel number positions may not be accessible.

Objects of the Invention

A principal object of the invention is to provide an improved television receiver having a single switch closure control system.

Another object of the invention is to provide a more flexible institutional television receiver system.

A further object of the invention is to provide an institutional television receiver system having a single switch closure control system that permits unrestricted positioning of the ON channel position.

Brief Description of the Drawings

These and other objects and advantages of the invention will be apparent upon reading the following description in conjunction with the drawings in which.

Description of the Preferred Embodiment

While the invention will be described in connection with a healthcare environment of a television receiver system it will be understood that other arrangements of single closure control television receiver systems are included.

Figure 1:
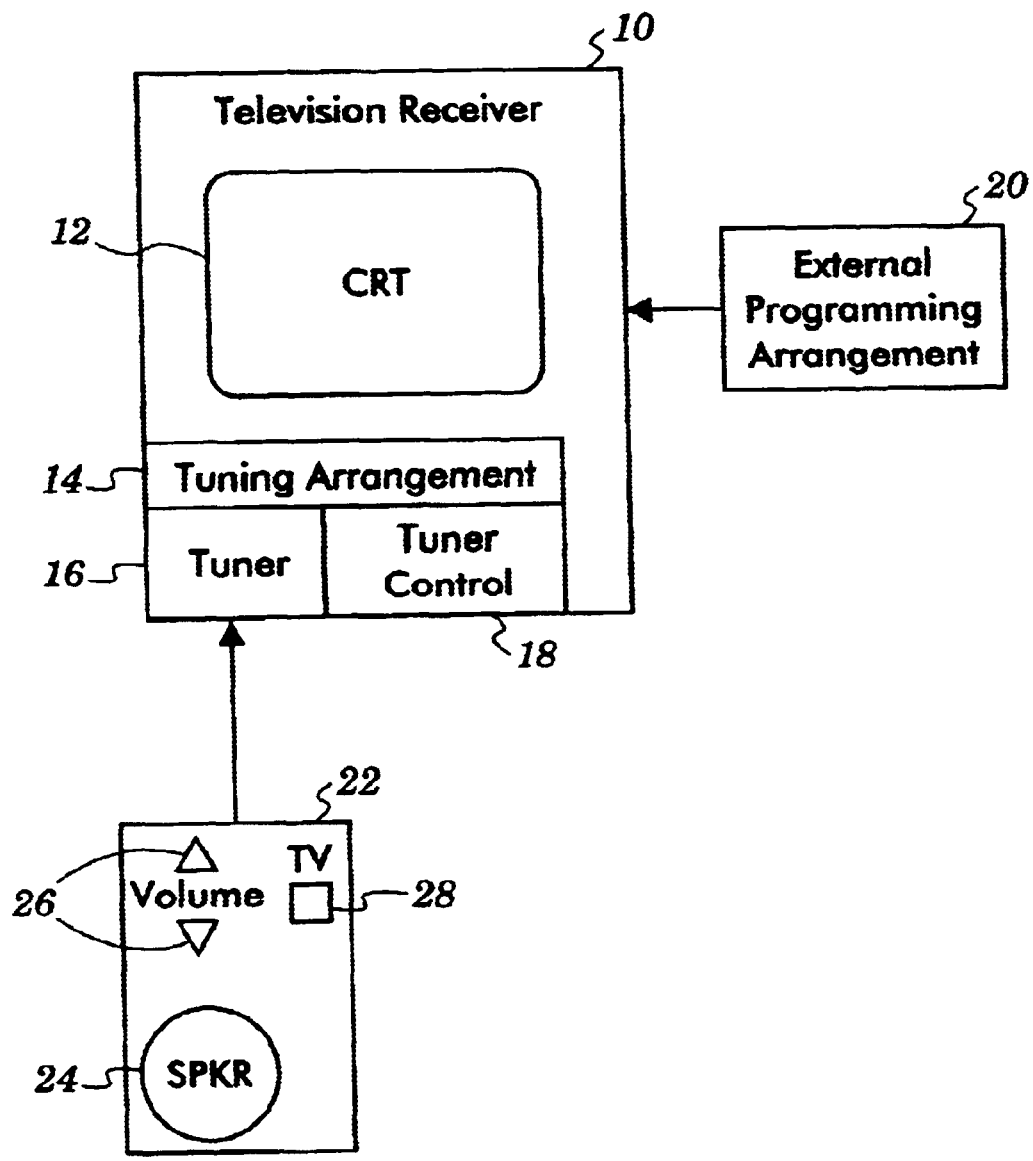
FIG. 1 depicts a prior art television receiver having a single switch closure control system.

Referring to FIG. 1, a prior art single closure control television receiver system is shown as including a television receiver 10 with an external programming arrangement 20 and a patient pendant control mechanism 22. The television receiver 10 includes a cathode ray tube 12, and a tuning arrangement 14 that comprises a tuner 16 and a tuner control 18. The pendant mechanism 22 includes a pillow speaker 24 for reproducing audio from the television receiver, two control buttons 26 for controlling the volume of the reproduced audio signal and a single closure switch 28 for controlling tuner control 18. The pillow speaker arrangement is well known in the art for enabling patients to listen to television and other audio signals without disturbing other patients in the room or vicinity. External programming arrangement 20 is also well known and represents the means by which the hospital controls what is displayed on television receiver 10.

Figure 2:
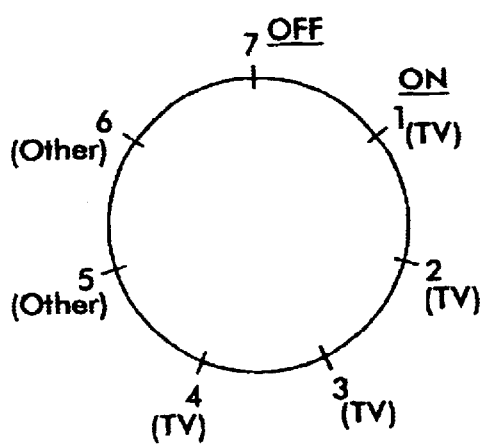
FIGS. 2 and 3 are tuning sequence diagrams for the prior art system of FIG. 1.

As indicated in FIG. 2, the single closure control system functions to sequentially step tuner 16 among a plurality of cyclically arranged positions, herein indicated for purposes of explanation as consisting only of positions 1–7. The tuner, which in all likelihood is electronic, may be viewed for purposes of explanation as a seven position mechanical device, in which various television channels may be viewed at certain positions (1–4) and other signals viewed (or listened to only in the case of radio stations) at other positions (5 and 6). As conventionally set up, the first or lowest numbered position (1) is established as the ON position and the last or highest numbered position (7) is established as the OFF position.

In operation, upon the first closure of switch 28, the television receiver 10 is activated or turned on and tuned to the television signal present at position 1. Subsequent positions are accessed by successive closures of switch 28 or by maintaining a continuous closure of the switch. Stopping at position 5 or 6 will enable programs other than television programs to be received by the patient, in the selected example. When position 7 is accessed, the television receiver is deactivated. This arrangement for controlling a television receiver has been in use for very many years.

Figure 3:
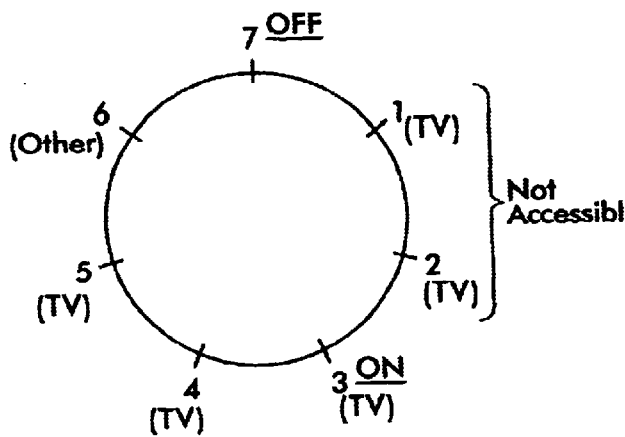

As alluded to above, should the hospital desire to change the ON channel position (by means of external programming arrangement 20), and cause the television receiver to be activated in a different position, a situation such as that illustrated in FIG. 3 results due to the fact that the OFF position is not movable in the prior art arrangements. In the FIG. 3 showing, the ON position has been moved to position 3 with the result that the positions between the ON and OFF positions are rendered inaccessible. This occurs because when the tuner is tuned to position 7 the television receiver is deactivated. When the receiver is activated again, it powers on in position 3, thus making it impossible to access positions 1 and 2.

Figure 4:
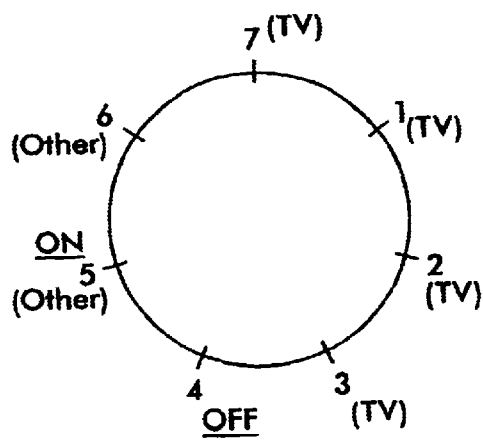
FIGS. 4 and 5 are tuning sequence diagrams for a television receiver having a single switch closure system operated in accordance with the invention.
Figure 5:
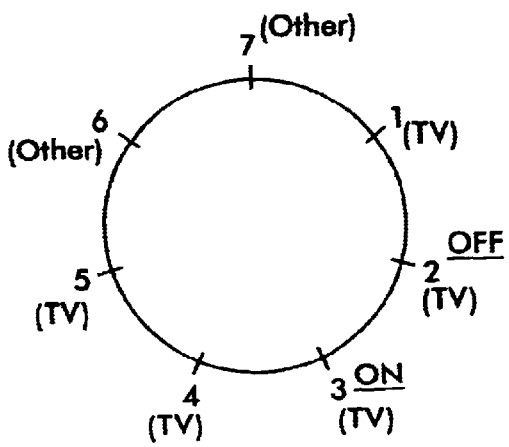

In FIG. 4, a similar tuning example is given with the invention being applied. Here the ON position is established at position 5, which is indicated as an "other" position, i.e., one at which a signal, other than a television signal, is present. These "other" signals may be radio signals, informational video signals, advertising, or the like, all at the discretion of the institution. In accordance with the invention, the OFF position (4) is established at the position below the ON position (5). With this arrangement, the television receiver is activated in position and all other positions continue to be accessible as they were before the change in ON position. None of the positions are rendered inaccessible by the change. Similarly, for FIG. 5 the ON position has been established as position 3 (a normal television channel position) and the OFF position established as position 2 (the position immediately below the ON position) in accordance with the invention. Here again, all positions remain accessible.

With the invention the hospital or other institution may arrange the television receivers to activate or power on in any desired channel position without sacrificing access to any other channel position or positions. This added flexibility might be used by the hospital or institution in a variety of ways for educational or other purposes.

What has been described is a novel single closure control television receiver arrangement that affords the institutional user flexibility in setting up television in-house programming. It is recognized that numerous changes to the described embodiment of the invention will be apparent to those skilled in the art without departing from its true spirit and scope. The invention is to be limited only as defined in the claims.

What is claimed is:

1. A method of operating a television receiver system with a single switch closure control, the system having a cyclically arranged sequence of tuning positions that are individually accessible responsive to repeated operations of the single switch closure control, the sequence including an OFF position at which the television receiver system is deactivated, comprising:

establishing any of the sequence of tuning positions as an ON position to which the television receiver is tuned whenever it is activated; and establishing the OFF position to be immediately below the established ON position.

2. The method of claim 1, wherein the sequence of tuning positions includes television signal positions and other signal positions, and further comprising:

establishing the ON position as one of the other signal positions.

3. The method of claim 2, wherein the single switch closure control is included in a pendant mechanism that may also include a pillow speaker and a volume control for enabling controlled reproduction of audio signals in the television receiver system.

4. A television receiver system comprising:

a tuning arrangement having a sequence of cyclically arranged positions;

a single switch closure control for sequentially selecting said positions of said tuning arrangement responsive to repeated actuations of said single switch closure control;

means for establishing any of said positions as an ON position for said tuning arrangement when said television receiver is activated; and means for establishing the position immediately below said ON position as an OFF position for deactivating said television receiver.

5. The system of claim 4, wherein said sequence of positions is numbered and wherein said OFF position and said ON position are interposed between the lowest and highest numbers of said sequence.

6. The system of claim 5, wherein some of said positions correspond to television signals and others of said positions correspond to other signals, and wherein said ON position corresponds to one of said other positions.

7. The system of claim 6, further including:

a pendant device which includes a pillow speaker and volume control coupled to said television receiver system for enabling controlled reproduction of audio signals in said television receiver system.

* * * * *